United States Patent
Fucke et al.

(10) Patent No.: US 9,359,067 B2
(45) Date of Patent: Jun. 7, 2016

(54) METHOD OF FLYING AN UNMANNED AERIAL VEHICLE

(71) Applicant: The Boeing Company, Chicago, IL (US)

(72) Inventors: Lars Fucke, Madrid (ES); Stephen Sweeney, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 291 days.

(21) Appl. No.: 14/189,603

(22) Filed: Feb. 25, 2014

(65) Prior Publication Data
US 2014/0288730 A1   Sep. 25, 2014

(30) Foreign Application Priority Data

Mar. 19, 2013   (EP) ..................................... 13382098

(51) Int. Cl.
*B64C 19/00* (2006.01)
*G05D 1/00* (2006.01)
*G05D 1/10* (2006.01)

(52) U.S. Cl.
CPC ............... *B64C 19/00* (2013.01); *G05D 1/0005* (2013.01); *G05D 1/101* (2013.01)

(58) Field of Classification Search
CPC ... G05D 1/0202; G05D 1/0005; G05D 1/101; B64C 19/00
See application file for complete search history.

(56) References Cited

U.S. PATENT DOCUMENTS

| 7,874,521 B2 * | 1/2011 | Shuster | G05D 1/105 244/175 |
| 2004/0193334 A1 * | 9/2004 | Carlsson | G05D 1/0022 701/9 |
| 2007/0129855 A1 * | 6/2007 | Coulmeau | G08G 5/0039 701/3 |

FOREIGN PATENT DOCUMENTS

| DE | 19849857 A1 | 5/2000 |
| DE | 19909573 A1 | 9/2000 |

(Continued)

OTHER PUBLICATIONS

Williams, "A Summary of Unmanned Aircraft Accident/Incident Data: Human Factors Implications," Civil Aerospace Medical Institute, Federal Aviation Administration, DOT/FAA/AM-04/24, Dec. 2004, 18 pages.

(Continued)

*Primary Examiner* — Thomas G Black
*Assistant Examiner* — Ana Thomas
(74) *Attorney, Agent, or Firm* — Yee & Associates, P.C.

(57) ABSTRACT

The invention relates to a method of flying an unmanned aerial vehicle (UAV) in response to emergency conditions, the method including steps implemented using a controller forming part of the unmanned aerial vehicle, the steps comprising: defining a plurality of emergency conditions; associating each emergency condition with a priority level; associating each emergency condition with an objective; sensing a plurality of operating parameters of the unmanned aerial vehicle to detect whether one of the plurality of emergency conditions exists; when one or more emergency condition is detected: generating a trajectory for the detected emergency condition having a highest associated priority level, wherein the trajectory is generated in accordance with the objective associated with the emergency condition that has the highest associated priority level; and instructing the unmanned aerial vehicle to follow the generated trajectory.

17 Claims, 4 Drawing Sheets

(56) References Cited

FOREIGN PATENT DOCUMENTS

| EP | 1462898 | A2 | | 9/2004 | |
|---|---|---|---|---|---|
| EP | 2853971 | A1 | * | 9/2013 | ............... G05D 1/00 |

OTHER PUBLICATIONS

Williams, "Human Factors Implications of Unmanned Aircraft Accidents: Flight-Control Problems," Civil Aerospace Medical Institute, Federal Aviation Administration, DOT/FAA/AM-06/8, Apr. 2006, 10 pages.

Persiani et al., "Three-Dimensional Obstacle Avoidance Strategies for Uninhabited Aerial Systems Mission Planning and Replanning," Journal of Aircraft vol. 46, No. 3, May-Jun. 2009, pp. 832-846.

Mueller, et al., "4-D Operational Concepts for UAV/ATC Integration," NASA Ames Research Center, 2nd AIAA "Unmanned Unlimited" Systems, Technologies, and Operations—Aerospac, San Diego, California, Sep. 15-18, 2003.

EP Search Report, dated Jul. 30, 2013, regarding Application No. EP13382098.5, 6 pages.

* cited by examiner

METHOD OF FLYING AN UNMANNED AERIAL VEHICLE

This Application claims the benefit of priority to European Patent Application Serial No. 13382098.5, filed on Mar. 19, 2013, the contents of which are hereby incorporated by reference.

BACKGROUND INFORMATION

1. Field

The invention relates to a method of flying an unmanned aerial vehicle (UAV) in response to emergency conditions.

2. Background

UAVs are typically controlled by a remote operator via wireless communication. It is often the case that when a component of the UAV fails, or some functionality is lost, the unmanned aerial vehicle is unable to carry out a suitable change to its flight plan.

Furthermore, nothing in the prior art considers the possibility of multiple failures occurring.

Therefore, it would be desirable to have a method and apparatus that takes into account at least some of the issues discussed above, as well as other possible issues.

SUMMARY

According to a first aspect of the invention there is provided a method of flying an unmanned aerial vehicle, the method including steps implemented using a controller forming part of the unmanned aerial vehicle, said steps comprising defining a plurality of emergency conditions, associating each emergency condition with a priority level, associating each emergency condition with an objective, sensing a plurality of operating parameters of the unmanned aerial vehicle to detect whether one of the plurality of emergency conditions exists, when one or more emergency condition is detected generating a trajectory for the detected emergency condition having the highest associated priority level, wherein the trajectory is generated in accordance with the objective associated with the emergency condition that has the highest associated priority level; and instructing the unmanned aerial vehicle to follow the generated trajectory.

According to a second aspect of the invention there is provided an emergency response system for an unmanned aerial vehicle, comprising an input for receiving a plurality of operating parameters of the unmanned aerial vehicle; a processor arranged to detect when one or more emergency conditions are present using the operating parameters, identify a priority level associated with the emergency condition, identify an objective associated with the emergency condition associated with the highest priority level, generate a trajectory based upon the identified objective, and an output for outputting a generated trajectory.

In yet another aspect of the invention, the method includes storing a plurality of flight termination points, and identifying an available subset of the plurality of flight termination points at which a landing is possible, where the step of generating a trajectory involves generating a trajectory terminating at one of the available subset.

In another aspect of the invention, the method includes associating each of the stored flight termination points with a rank, where the step of generating a trajectory terminating in the one of the available subset involves selecting the flight termination points of the available subset that are associated with a highest rank, and generating a trajectory terminating at one of the selected flight termination points.

In another aspect of the invention, the unmanned aerial vehicle has an engine for providing propulsion, the operating parameters include the output speed of the engine, and one of the plurality of emergency conditions is engine failure.

In yet another aspect of the invention, the emergency condition of engine failure is associated with the highest priority level.

In still another aspect of the invention, the objective associated with the emergency condition of engine failure is the most efficient gliding trajectory to a flight termination point.

In another aspect of the invention, the unmanned aerial vehicle includes means for providing electrical power, the operating parameters comprise the level of current provided by the means for providing electrical power, and the method comprises the step of defining a threshold current, and one of the plurality of emergency conditions is the level of current being lower than the threshold current.

In yet another aspect of the invention, the emergency condition of the level of current being lower than the threshold current is associated with the second highest priority level.

In another aspect of the invention, the objective associated with the emergency condition of the level of current being lower than the threshold current is the fastest return to a flight termination point.

In yet another aspect of the invention, the unmanned aerial vehicle comprises a stored resource, and the operating parameters comprise the amount of stored resource, the method comprises the step of defining a threshold amount of stored resource, and one of the plurality of emergency conditions is the amount of stored resource being lower than the threshold amount.

In still another aspect of the invention, the emergency condition of the amount of stored resource being lower than the threshold amount is associated with the third highest priority level.

In another aspect of the invention, the step of defining a threshold amount includes identifying a flight termination point, generating a trajectory terminating in the identified flight termination point, and determining a minimum amount of stored resource required to achieve the trajectory.

In yet another aspect of the invention, the objective associated with the emergency condition of the amount of stored resource being lower than the threshold amount is the most economic return to a flight termination point.

In another aspect of the invention, the unmanned aerial vehicle includes a communications system for receiving a control signal from a remote station, the operating parameters include the strength of the control signal, the method includes the step of defining a threshold signal strength, and one of the plurality of emergency conditions is the strength of the control signal being lower than the threshold signal strength.

In still another aspect of the invention, the emergency condition of the strength of the control signal being lower than the threshold signal strength is associated with the lowest priority level.

In yet another aspect of the invention, the objective associated with the emergency condition of the strength of the control signal being lower than the threshold signal strength is the most economic return to a flight termination point.

Another aspect of the invention is an emergency response system for an unmanned aerial vehicle, including an input for receiving a plurality of operating parameters of the unmanned aerial vehicle, a processor arranged to detect when one or more emergency conditions are present using the operating parameters, and identify a priority level associated with the emergency condition, identify an objective associated with the emergency condition associated with the highest priority level, generate a trajectory based upon the identified objective, and an output for outputting a generated trajectory.

In still another aspect of the invention the emergency response system is arranged to carry out the method of flying an unmanned aerial vehicle, the method including steps implemented using a controller forming part of the unmanned aerial vehicle, including defining a plurality of emergency conditions, associating each emergency condition with a priority level, associating each emergency condition with an objective, sensing a plurality of operating parameters of the unmanned aerial vehicle to detect whether one of the plurality of emergency conditions exists, and when one or more emergency condition is detected, generating a trajectory for the detected emergency condition having the highest associated priority level, wherein the trajectory is generated in accordance with the objective associated with the emergency condition that has the highest associated priority level, and instructing the unmanned aerial vehicle to follow the generated trajectory.

In another aspect of the invention a UAV includes the emergency response system of the invention.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 2:
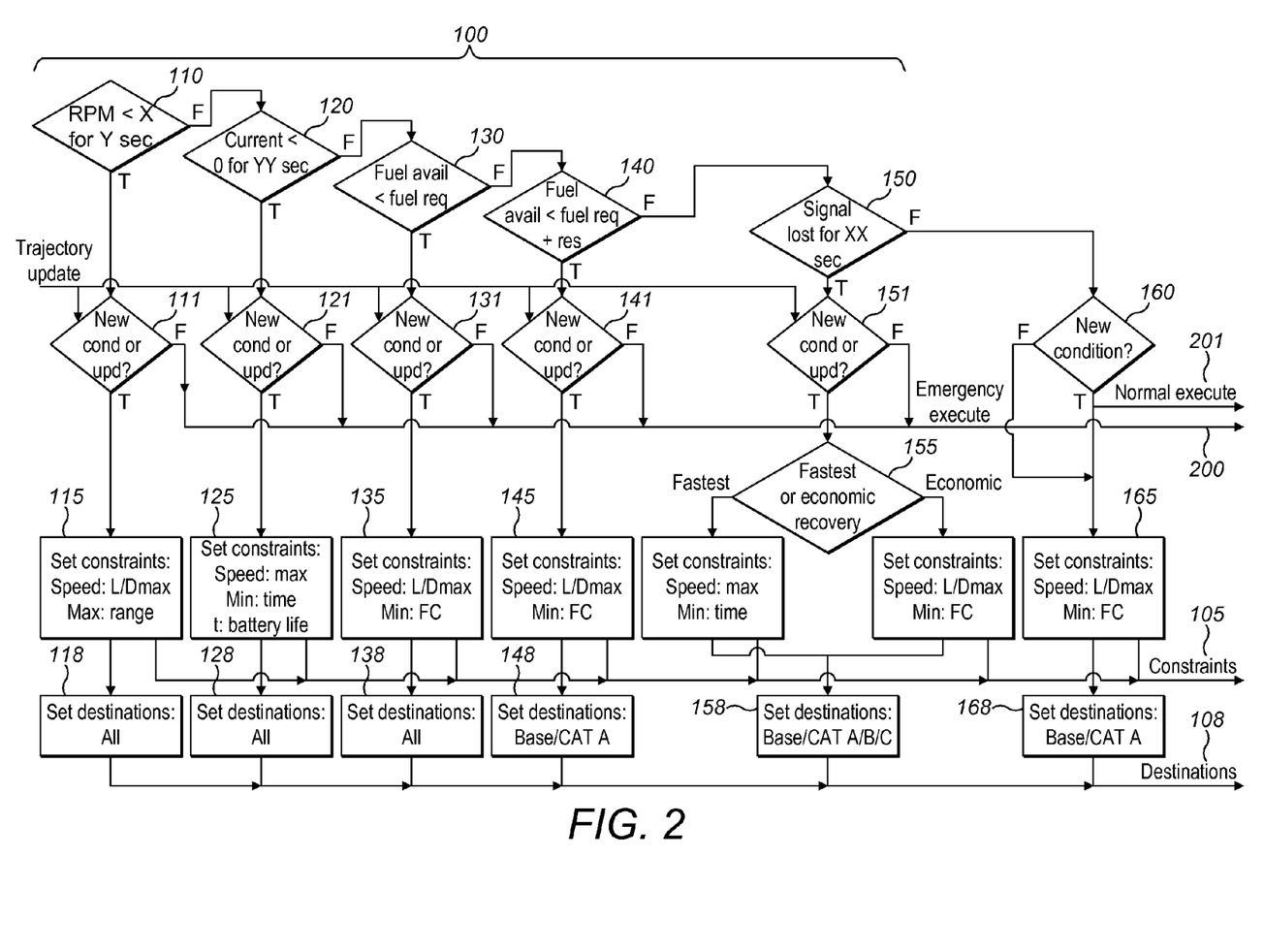
FIG. 2 shows a flow chart representing a method of implementing an emergency response.
Figure 4:
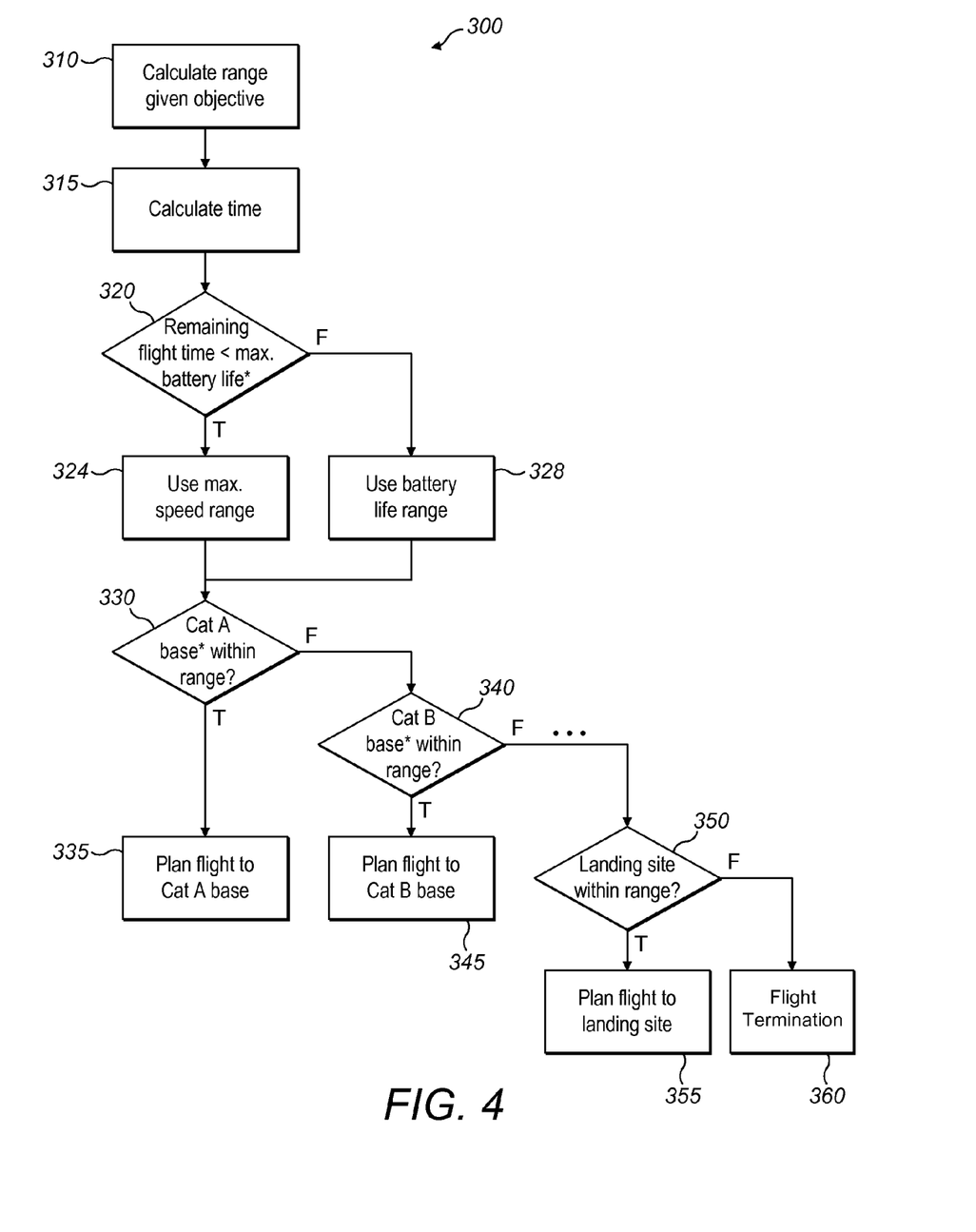
FIG. 4 shows a flow chart representing a method of selecting a flight termination point.

In the flow charts, the diamond-shaped boxes represent decisions that alter the path of the method through the flow chart depending on their outcome. If the condition in the diamond-shaped box is true, then the method follows the path labelled "T". If the condition in the diamond-shaped box is false, then the method follows the path labelled "F". In decision box 155, the choice of path may be determined by whether the fastest or most economic recovery is selected by a user.

Figure 1:
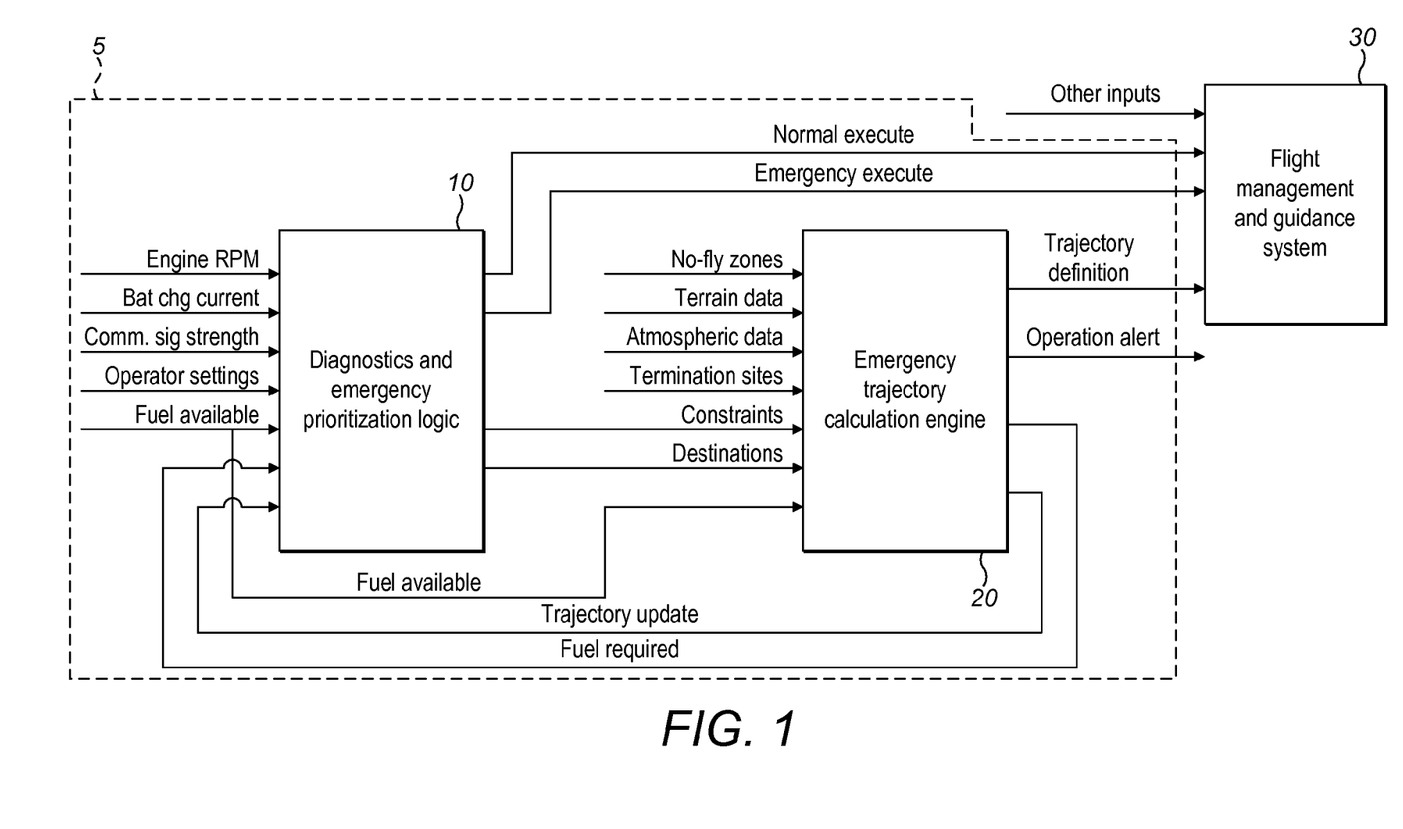
FIG. 1 shows a schematic representation of an emergency response module of a flight control system for a UAV.

FIG. 1 shows a schematic representation of an emergency response module 5, and how this interacts with a conventional flight management and guidance system 30 of the UAV.

The emergency response module 5 forms part of a UAV.

The emergency response module 5 may comprise: a diagnostics and prioritisation system 10; and a trajectory calculation engine 20.

Figure 3:
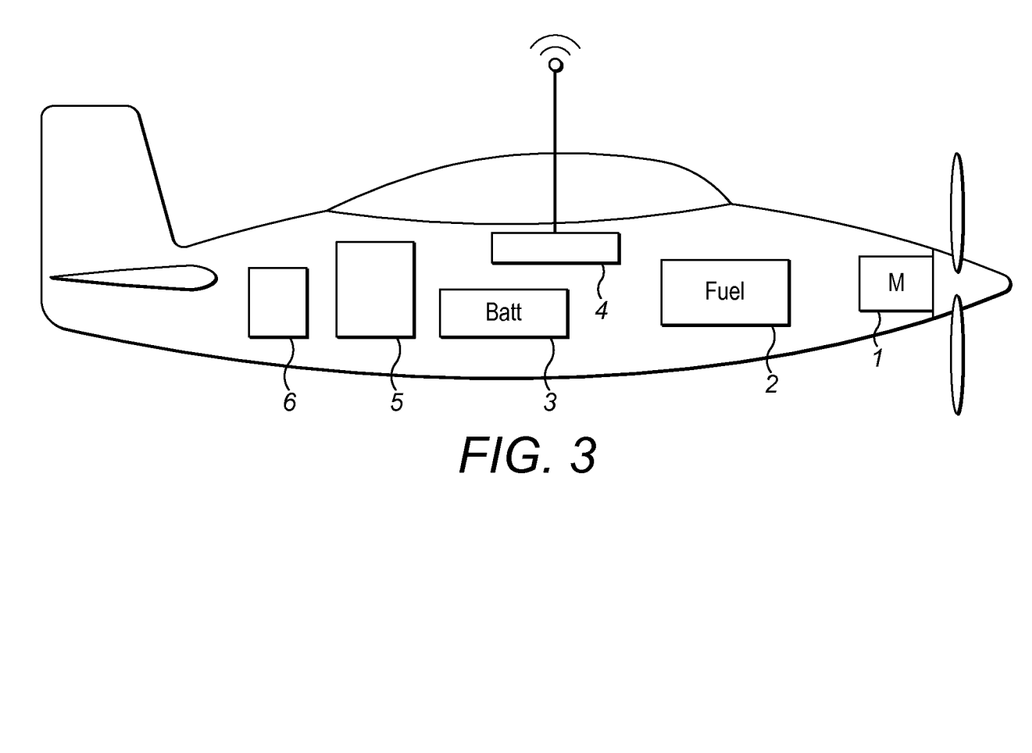
FIG. 3 shows a UAV.

As shown in FIG. 3, the emergency response module 5 may be used to control a UAV having an engine 1; a fuel tank 2; an electrical power source 3, such as a battery; and a communications system 4.

This may be achieved by using the emergency response module 5 to provide signals directly to the flight management and guidance system 30 of the UAV. Such signals might include a normal execute signal indicating that the UAV should continue with its normal operation, for example to continue to follow a predetermined flight plan.

Additionally, or instead, the signals might include an emergency execute signal indicating that the UAV should cease normal operation and execute an emergency response, for example to follow an emergency trajectory provided by the emergency response module 5. An emergency trajectory may be provided by the trajectory calculation engine 20.

The diagnostics and prioritisation system 10 is arranged to receive signals that may represent operating parameters of the UAV. The operating parameters may include: the speed of the engine 1; the amount of fuel in the fuel tank 2; the magnitude of a current provided by the electrical power source 3; the level of charge in battery; the strength of the signal received by the communications system 4.

The diagnostics and prioritisation system 10 monitors the operating parameters to detect an emergency condition in one of the systems of the UAV.

The emergency conditions may include a combination of:
1. Engine failure;
2. Failure of electrical power source;
3. Range limit; and/or
4. Communication loss.

Engine failure may be established when the speed of the engine 1 is below that of a threshold engine speed. The threshold engine speed may be determined as that commanded by the flight management and guidance system 30.

Failure of electrical power source 3 may be, for example, a low battery. Alternatively, the electrical power source 3 may be a generator driven by a combustion engine. Failure of electrical power source 3 may be established with the current provided by the electrical power source is less than a threshold current (e.g. 0 amps).

Low battery may be established when the level of charge stored in the battery is lower than a threshold battery charge. The threshold battery charge may be determined as a level below which degradation of the battery may result or threshold voltage.

Alternatively, the threshold battery charge may be determined with reference to range in the manner discussed below. This is preferred in a UAV that is powered by an electric motor rather than a combustion engine.

Range limit refers to when a stored resource such as battery charge or available fuel is insufficient to allow the UAV to achieve a flight along a desired trajectory. An example of the range limit emergency condition may be low fuel. When the UAV is powered by an electric motor rather than a combustion engine, range limit and failure of electrical power source may be the same emergency condition. Low fuel may be established when the amount of fuel in the fuel tank 2 is lower than a threshold amount of fuel. Determination with reference to range of the threshold amount of fuel is discussed below.

Communication loss may be established when the strength of the control signal is lower than a threshold signal strength. The threshold signal strength may be determined as a strength for which the signal to noise ratio is sufficient to enable communication.

Preferably, the diagnostics and prioritisation system 10 detects an emergency condition once the required state (e.g. low communications signal) has been true for a predetermined minimum period. In this way, temporary and short fluctuations in a monitored operating parameter will not unnecessarily trigger an action.

Preferably, the diagnostics and prioritisation system 10 can detect the removal of an emergency condition to return the UAV to the state it was in prior to the detection of any emergency condition.

Each of the emergency conditions that the diagnostics and prioritisation system 10 is arranged to detect is associated with a priority level. The priority level defines the relative importance of the emergency condition.

Preferably, engine failure has a higher priority than failure of electrical power source 3, range limit, and communication loss. Preferably, failure of electrical power source 3 has a higher priority than range limit. Preferably, communication loss has a lower priority than engine failure, failure of electrical power source 3, and range limit.

The diagnostics and prioritisation system 10 produces one or more outputs, which may include: the normal execute signal; the emergency execute signal; a signal indicating an objective to be used by the trajectory calculation engine 20 to provide an emergency trajectory; and/or a signal indicating a desired flight termination point.

Each of the emergency conditions that the diagnostics and prioritisation system 10 is arranged to detect may be associated with an objective. The objective provides a constraint for how the UAV is to be flown following detection of the emergency condition. Specifically, it may form an input for the trajectory calculation engine 20 to thereby define a constraint for the algorithm that calculates trajectories.

Preferably, engine failure is associated with the objective of determining the most efficient gliding trajectory (i.e. the trajectory that maximises range) to a flight termination point, i.e. the trajectory that enables the UAV to glide to a flight termination point in the shortest possible time.

Preferably, failure of electrical power source 3 is associated with the objective of determining the fastest powered trajectory to a flight termination point, i.e. the trajectory that enables the UAV to reach a flight termination point in the shortest possible time (by propulsive means or otherwise).

However, in some cases, such as when the UAV is powered by an electric motor rather than a combustion engine, a low battery condition may be associated with the objective of determining the most efficient trajectory, i.e. the trajectory that requires the least amount of charge from the battery.

Preferably, range limit is associated with the objective of determining the most economic trajectory, e.g., the trajectory that would burn the smallest amount of fuel in an engine driven UAV, or use the lowest amount of battery charge in an electrical motor driven UAV.

Preferably, communication loss is associated with one of the objective of determining the most economic trajectory or the objective of determining the fastest powered trajectory. Most preferably, communication loss is associated with the objective of determining the most economic trajectory. The objective may be set by a user.

The diagnostics and prioritisation system 10 or an external database may store a plurality of flight termination points.

A preferred method of selecting a flight termination point from the stored plurality of flight termination points is shown in FIG. 4.

Each of the stored flight termination points may be associated with a category.

For example, the stored flight termination points may include: the highest category flight termination points—airfields with suitable runways that are equipped with suitable infrastructure for receiving a UAV; lower category flight termination points—airfields with suitable runways but without suitable UAV infrastructure; and the lowest category flight termination points—termination points other than runways in which the UAV can be landed safely.

The first step 310 in FIG. 4 is calculating the nominal range of the UAV based upon the objective relating to the highest priority emergency condition.

If the objective is the most efficient gliding trajectory (for engine failure), then the nominal range is calculated as the maximum gliding range of the UAV.

If the objective is the fastest powered trajectory (for failure of electrical power source 3), then the nominal range is calculated as the range of the UAV when operated at maximum speed.

If the objective is the most economic trajectory (for low fuel and communications loss), then the nominal range is calculated as the maximum range of the UAV.

In step 315, once the nominal range has been calculated, the time taken to reach the nominal range is calculated.

In step 320, the time taken to reach the nominal range is compared with the estimated battery life.

If the time taken to reach the nominal range is less than the estimated battery life, then in step 324, the nominal range is used as the estimated range of the UAV.

If the time taken to reach the nominal range is greater than the estimated battery life, then in step 328, the estimated range of the UAV is calculated as the distance the UAV can travel in the time remaining determined from the estimated battery life and given the current objective.

The next step 330, any flight termination points associated with the highest category (for example, category A in FIG. 4) and within the estimated range of the UAV are identified from the stored plurality of flight termination points.

If at least one flight termination point associated with the highest category is identified then, in step 335, the flight termination point associated with the highest category that is closest, fastest to reach, or reachable using the least amount of stored resource, is selected.

If none is found, then in step 340, any flight termination points associated with the next highest category (for example, category B in the Figure) and within the estimated range of the UAV are identified from the stored plurality of flight termination points.

If at least one flight termination point associated with this category is identified then, in step 345, the closest flight termination point associated with this category is selected.

If none is found, then the process of steps 340 is repeated for each category in descending order until in step 350, any flight termination points associated with the lowest category and within the estimated range of the UAV are identified from the stored plurality of flight termination points.

If at least one flight termination point associated with the lowest category is identified then, in step 355, the closest flight termination point associated with the lowest category is selected.

In preferred embodiments, if at least one flight termination point associated with the lowest category cannot be identified from the stored flight termination points then, in step 360, the UAV may execute flight termination at flight termination point that is not one of the stored flight termination points. This may involve selecting a flight termination point near the current location of the UAV, or selecting a flight termination point distant (for example, at the greatest achievable distance) from a location or area (for example, a residential area).

Optionally, the UAV may deploy a parachute 6 during the flight termination, or enter a forced stall, spiral dive or other maneuver. Accordingly, the UAV can terminate the flight in a predictable manner.

Also optionally, in step 360 the UAV may transmit an impact point to a user. The impact point may be predicted in advance of a flight termination.

The trajectory calculation engine 20 may be arranged to receive flight termination points and objectives from the diagnostics and prioritisation system 10.

Optionally, the trajectory calculation engine 20 may also be arranged to receive input signals indicative of the amount of fuel in the fuel tank 2.

Optionally, the trajectory calculation engine 20 may also be arranged to receive input signals providing: the location and extent of any no-fly zones; data relating to the surrounding terrain; atmospheric data; and/or termination sites.

The trajectory calculation engine 20 may generate a trajectory between the current position of the UAV and the flight termination points provided by the diagnostics and prioritisation system 10. The calculation of the trajectory may be subject to the objectives provided by the diagnostics and prioritisation system 10.

The trajectory may be calculated by determining the shortest path taking into consideration any obstacles or no-fly zones.

Optionally, an alert output is provided for instructing the communication system 4 of the UAV to transmit an alert to a remote operator. This can be utilised in each emergency condition with the exception of the communication loss emergency condition.

FIG. 2 shows a flow chart of an embodiment that may be carried out using the diagnostics and prioritisation system 10 of FIG. 1. In FIG. 2, the emergency conditions of: engine failure (see step 110); failure of electrical power source (see step 120); range limit (see step 130); range limit incorporating a reserve of a resource (see step 140;) and communications loss (see step 150;) and considered. However, it is not essential to consider all of these conditions and embodiments having any combination of these conditions are envisaged.

As can be seen in FIG. 2, the diagnostics and prioritisation system 10 evaluates flight parameters 100 to establish each of the emergency conditions sequentially and in order of priority level.

That is, in step 110, the diagnostics and prioritisation system 10 first evaluates the flight parameters 100 required to establish whether the emergency condition associated with the highest priority level is present.

If the emergency condition associated with the highest priority level is not detected, then in step 120 the diagnostics and prioritisation system 10 then evaluates the flight parameters 100 required to establish whether the emergency condition associated with the next highest priority level is present.

If the emergency condition associated with the lowest priority level is not detected, then in step 160 the diagnostics and prioritisation system 10 determines whether this is a new state, i.e. whether an emergency condition had previously been present, but was now absent (e.g. if an emergency condition had only been detected temporarily). If this is a new state, then the diagnostics and prioritisation system 10 identifies that a normal condition exists. In such cases, the system may in step 201 provide a normal execution signal to the flight management and guidance system 30 of the UAV. The method then returns to step 100.

If the absence of an emergency condition is not a new state then the UAV may continue on its present path.

In any event, a trajectory to a flight termination point is calculated. This may be for determining resource requirements (e.g. fuel or battery). This trajectory may be used to calculate whether the range limit conditions of steps 130 and 140 are met. The flight termination point may be selected using the method of FIG. 4 and the objective associated with range limit, i.e. the most economic trajectory. In this step, the trajectory is preferably calculated as the trajectory to a flight termination point in a user defined category of flight termination points.

Thus, the diagnostics and prioritisation system 10 continually establishes whether each emergency condition is present sequentially and in order of decreasing priority level.

If it is established that an emergency condition is present, the diagnostics and prioritisation system 10 checks, in steps 111, 121, 131, 141, 151, whether this is a new detection of an emergency condition, or whether the emergency condition had been detected previously.

If it is not a new emergency condition, then the process of evaluating flight parameters 100 repeats.

If it is established in steps 111, 121, 131, 141, 151, that a new emergency condition has been detected, then the diagnostics and prioritisation system 10 identifies the objective associated with the detected emergency condition in steps 115, 125, 135, 145, 151. A new emergency condition has been detected either when no emergency condition has previously been detected, of if the previously detected condition had a higher priority.

In step 105, the diagnostics and prioritisation system 10 then provides the identified objective to the trajectory computation engine 20. In each of steps 118, 128, 138, 148, 158, the method may determine a flight termination point. This may be done using the method described above. The flight termination point is provided to the trajectory computation engine 20 in step 108, which then calculates a trajectory using the objective. The calculated trajectory is passed to the flight management and guidance system 30 of the UAV for execution. The process of evaluating flight parameters 100 is then repeated.

In preferred embodiments, such as that shown in FIG. 2, when an emergency condition is detected, the system will not evaluate the flight parameters 100 required to establish whether the emergency conditions associated with lower priority levels are present. However, the system will evaluate the flight parameters 100 required to establish whether the emergency conditions associated with higher priority levels are present.

For example, if the low fuel emergency condition is present, the method will detect this in step 130 and progress to step 131, which will either (if it is not a new emergency condition) direct the method back to step 100, or (if it is a new emergency condition) progress via steps 131, 135, 138, 105, and 108 back to step 100. Following step 100, the emergency conditions with a higher priority will again be evaluated in steps 110 and 120, but the method will not progress to step 140 while the low fuel emergency condition is present.

If, when an emergency condition has been detected, a further emergency condition with a higher associated priority level is detected for the first time, the diagnostics and prioritisation system 10 identifies the objective associated with the newly detected emergency condition and then provides the identified objective to the trajectory computation engine 20. The process of evaluating flight parameters 100 is then repeated, but now does not evaluate the emergency conditions of lower priority.

Thus, when an emergency condition has been detected, the system continually monitors for emergency conditions with higher priority levels and provides new instructions if one of these is detected. The new instructions therefore override any existing instructions.

Optionally, and not shown in FIG. 2, when communications loss is detected and is a new condition, the diagnostics and prioritisation system 10 checks whether communication is required to complete the remainder of the existing mission. Preferably, a stored predetermined flight plan may include meta data indicating that for at least a portion of the flight a human operator should be able to communicate with the UAV (for example, this may be to allow the operator to receive live streaming video data, or to allow the operator to control a device on the UAV or the UAV itself).

If communication is not required, then the method returns to step 100. If communication is required, then the method proceeds to step 155, where the user setting of the objective may be checked to determine which objective to use for computation of the emergency trajectory.

One way of detecting the emergency condition of range limit is to use the conventional concept of bingo fuel. That is to compare the amount of fuel in the fuel tank 2 with a threshold amount of fuel (bingo fuel). When the amount of fuel stored in the fuel tank 2 decreases to the threshold the emergency condition of low fuel may be determined.

A more sophisticated, optional, alternative approach is for the emergency response module 5 to calculate the amount of stored resource required to fly to a flight termination point. The stored resource may be fuel stored in the fuel tank 2, or when the UAV is driven by an electric motor powered by a battery, the amount of battery charge. Preferably, the trajectory calculation engine 20 substantially continually calculates the amount of resource (fuel or battery charge) required to fly to a termination point. For example, this may be calculated in steps 165 and 168 in FIG. 2.

This calculated amount of resource can be compared with the stored amount of resource (fuel stored in the fuel tank 2 or charge stored in the battery). Preferably, this would also involve a safety factor such that the emergency condition of range limit would be detected when the amount of stored resource is greater than the amount of the resource required to fly to a flight termination point by a fixed "reserve" amount.

In FIG. 2, the emergency condition of reserve limit is shown as an additional condition in step 140. This emergency condition is detected when the amount of stored resource is less than the amount of the resource required to fly to a flight termination point plus a fixed "reserve" amount. As with range limit, this emergency condition is associated with the objective of determining the most economic trajectory. However, in this case flight termination points associated with the lowest category are not considered.

Alternatively, the emergency condition of low fuel could be detected when the amount of fuel required to fly to a flight termination point is greater than a predetermined percentage of the amount of fuel stored in the fuel tank 2.

Preferably, the trajectory computation engine 20 is used to evaluate the fuel required to carry out a flight plan or emergency trajectory.

While the disclosure has been described with reference to certain examples, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular examples disclosed, but that the present disclosure will include all examples falling within the scope of the appended claims.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of flying an unmanned aerial vehicle, the method including steps implemented using a controller forming part of the unmanned aerial vehicle, said steps comprising:
   defining a plurality of emergency conditions;
   associating each emergency condition of the plurality of emergency conditions with a corresponding priority level;
   associating the each emergency condition with a corresponding objective;
   sensing a plurality of operating parameters of the unmanned aerial vehicle to detect whether one of the plurality of emergency conditions exists;
   when one or more emergency conditions is detected:
   generating a trajectory for a particular emergency condition having a highest associated priority level, wherein the trajectory is generated in accordance with a particular objective associated with the particular emergency condition that has the highest associated priority level; and
   instructing the unmanned aerial vehicle to follow the trajectory.

2. The method of claim 1, further comprising the steps of:
   storing a plurality of flight termination points; and
   identifying an available subset of the plurality of flight termination points at which a landing is possible,
   wherein the step of generating the trajectory involves generating the trajectory terminating at one of the available subset.

3. The method of claim 2, further comprising the steps of:
   associating each of the plurality of flight termination points with a corresponding rank, wherein the step of generating the trajectory terminating in the one of the available subset involves:
   selecting the flight termination points of the available subset that are associated with a highest rank; and
   generating the trajectory terminating at one of the selected flight termination points.

4. The method of claim 1, wherein:
   the unmanned aerial vehicle comprises an engine for providing propulsion;
   the operating parameters comprise an output speed of the engine; and
   the particular emergency condition is engine failure.

5. The method of claim 4, wherein the engine failure is associated with a greatest priority level.

6. The method of claim 4, wherein the particular objective is a most efficient gliding trajectory to a flight termination point.

7. The method of claim 1, wherein:
   the unmanned aerial vehicle comprises means for providing electrical power;
   the operating parameters comprise a level of current provided by the means for providing electrical power;
   the method further comprises the step of defining a threshold current; and the particular emergency condition is the level of current being lower than the threshold current.

8. The method of claim 7, wherein the level of current is associated with a second greatest priority level.

9. The method of claim 7, wherein the particular objective is a fastest return to a flight termination point.

10. The method of claim 1, wherein:
the unmanned aerial vehicle comprises a stored resource;
the operating parameters comprise an amount of the stored resource;
the method comprises the step of defining a threshold amount of the stored resource; and
the particular emergency condition is the amount of stored resource being lower than the threshold amount.

11. The method of claim 10, wherein the particular emergency condition is a third greatest priority level.

12. The method of claim 10, wherein the step of defining the threshold amount comprises:
identifying a flight termination point;
generating a trajectory terminating in the identified flight termination point; and
determining a minimum amount of the stored resource required to achieve the trajectory.

13. The method of claim 10, wherein the particular objective is a most economic return to a flight termination point.

14. The method of claim 1, wherein:
the unmanned aerial vehicle comprises a communications system configured to receive a control signal from a remote station;
the operating parameters comprise a strength of the control signal;
the method comprises the step of defining a threshold signal strength; and
the particular emergency condition is a strength of the control signal being lower than the threshold signal strength.

15. The method of claim 14, wherein the particular emergency condition is a least priority level.

16. The method of claim 14, wherein the particular objective is a most economic return to a flight termination point.

17. An emergency response system for an unmanned aerial vehicle, comprising:
an input device configured to receive a plurality of operating parameters of the unmanned aerial vehicle;
a processor configured to:
detect when one or more emergency conditions are present using the plurality of operating parameters;
identify a corresponding priority level associated with each of the one or more the emergency conditions;
identify an objective associated with a particular emergency condition of the one or more emergency conditions that is associated with a highest priority level;
generate a trajectory based upon the objective; and
an output device configured to output the trajectory.

* * * * *